2,871,096
Patented Jan. 27, 1959

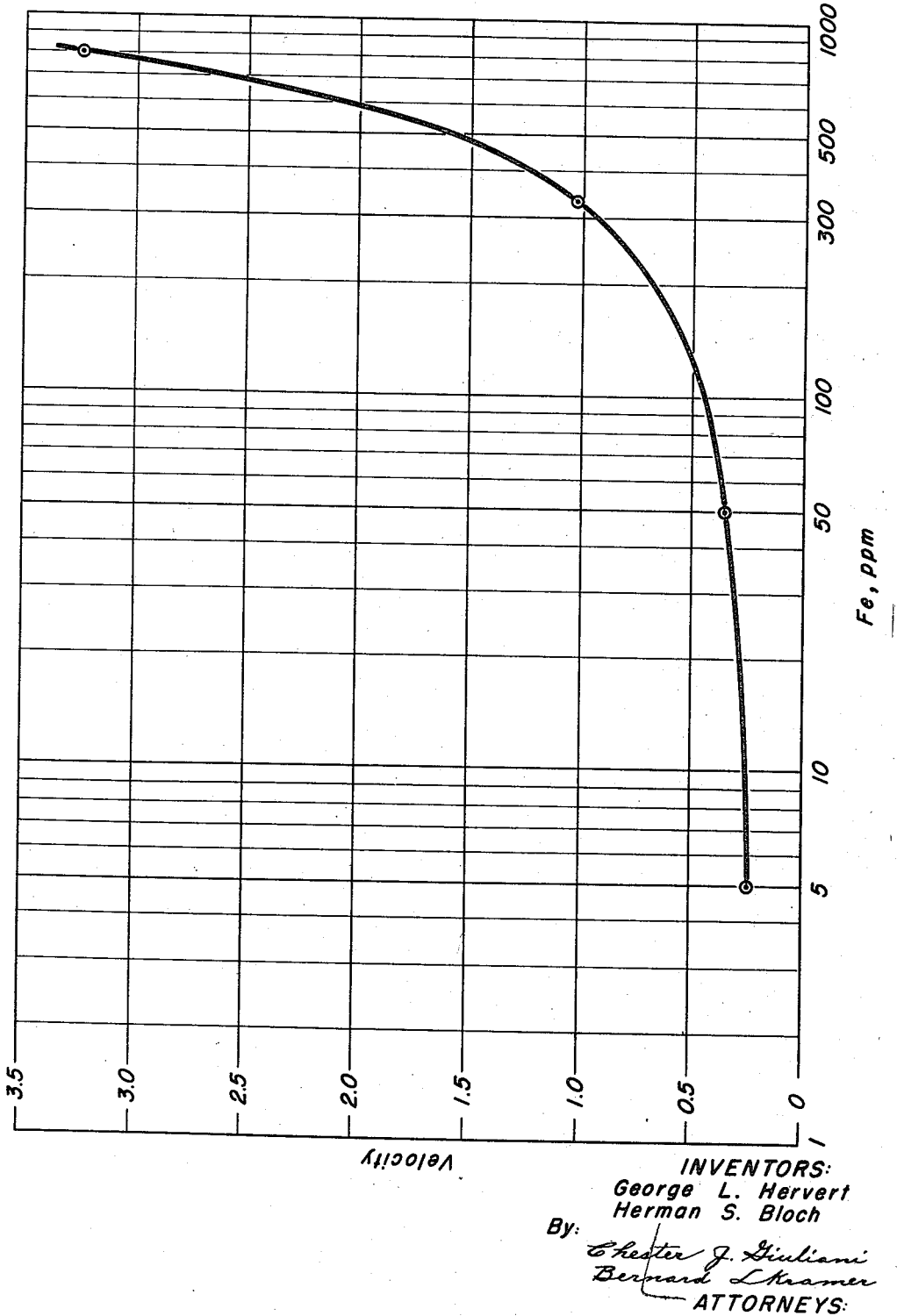

2,871,096

PRODUCTION OF ALUMINA

George L. Hervert, Downers Grove, and Herman S. Bloch, Skokie, Ill., assignors to Universal Oil Products Company, Des Plaines, Ill., a corporation of Delaware Application October 24, 1955, Serial No. 542,467

4 Claims. (Cl. 23—143)

This application is a continuation-in-part of our co-pending applications Serial No. 370,542, filed July 27, 1953, and Serial No. 315,414, filed October 17, 1952, both now abandoned.

This invention relates to the preparation of alumina and more specifically to a method of preparing alumina by the interaction of water and metallic aluminum in the presence of an activator comprising iron.

Almina, either as the hydrate or as anhydrous aluminum oxide, is widely used in many phases of the chemical and petroleum industries. It has been employed in the petroleum industry as a catalyst for hydrocarbon conversion processes, as a support for catalytically active materials to be used in hydrocarbon conversion processes and as a dehydrating agent. It is widely used in other industries for the same purposes. The activated forms, which are considered to be merely various physical modifications of aluminum oxide, are especially known for their pronounced catalytic activity and adsorptive capacity. The use of alumina as a refractory is also well known. Alumina in the form of corundum has been found suitable for use in the manufacture of certain types of refractory and ceramic materials. In other uses alumina is mixed or composited with other compounds to produce a wide variety of substances with useful properties.

It is an object of our invention to provide a new process for the production of alumina, and further to produce alumina more rapidly and easily than heretofore has been possible.

Alumina or aluminum hydrate is present in various modifications. The more common types of anhydrous alumina are as follows:

Alpha-alumina often known as corundum is the form stable at high temperatures.

Gamma-alumina is very stable but changes to alpha-alumina at temperatures above 1800° F.

Epsilon-alumina is the alumina formed in thin films on the surface of metallic aluminum during oxidation by dry or wet air or oxygen.

The following alumina hydrates or aluminum hydroxides are common or may be prepared in the laboratory:

Gamma-$Al_2O_3 \cdot 3H_2O$ or gibbsite is prepared by aging boehmite in a cold basic solution.

Alpha-$Al_2O_3 \cdot 3H_2O$ or bayerite is also formed by aging boehmite in a cold basic solution but is unstable and gradually is transformed into gibbsite.

Gamma-$Al_2O_3 \cdot H_2O$ or boehmite may be prepared in a variety of ways, one of the simplest being to add ammonium hydroxide to a water solution of aluminum chloride. The material originally precipitated is thought to be an amorphous alumina flock which rapidly grows in crystal size, yielding crystalline boehmite. Aging boehmite in ammonium hydroxide solution transforms the boehmite first to metastable bayerite and finally to the stable gibbsite.

Alpha-$Al_2O_3 \cdot H_2O$ or diaspore occurs abundantly in nature.

In the specification and claims the word alumina will mean one or more of these various modifications, either as anhydrous alumina or alumina hydrate or aluminum hydroxide unless otherwise specifically noted.

By varying the conditions of the process of the invention, several of the various modifications of alumina as hereinbefore described may be obtained. Further, the alumina as prepared by the reaction of water with metallic aluminum may be produced as definite particles such as crystals or in other modifications of the invention the alumina may be prepared as a sol or gel. The alumina may also be present as a slurry and in the slurry it appears that there may be crystals of alumina as well as alumina gel.

The usual commercial method of producing alumina is by purifying ores in which the oxide is present. Another method is by the precipitation of aluminum hydroxide from its salts. The preparation of alumina as at present practiced entails the addition of a basic reagent to a solution of aluminum chloride hexahydrate. The resultant precipitate is washed and filtered to remove undesirable impurities.

When alumina is prepared from the commercially available aluminum chloride hexahydrate, the precipitated alumina requires extensive washing and filtering in order to remove the impurities including excess chloride. The present invention offers a novel method of preparing alumina which eliminates the need for washing and filtration and thereby reduces the time and expense hereinbefore entailed in purifying the alumina.

We have discovered and our invention broadly comprises an improved method of preparing alumina by reacting metallic aluminum with water in the presence of an activator comprising at least one hundred weight parts per million of iron (based on the aluminum).

In one embodiment the present invention relates to a method for producing alumina which comprises reacting metallic aluminum with water in the presence of an activator comprising iron.

In another embodiment the present invention relates to a method for producing alumina which comprises reacting water with metallic aluminum having at least one hundred weight parts per million of iron (based on the aluminum) dissolved therein.

In a further embodiment the present invention relates to a process for producing alumina which comprises adding iron to metallic aluminum and subsequently reacting the mixture with water.

In a specific embodiment the present invention relates to a process for producing alumina which comprises dissolving iron in molten aluminum in an amount to produce a mixture containing of from about one hundred to about twenty-five hundred parts per million of iron (based on the aluminum), forming solid particles from the mixture and reacting the mixture at a temperature of from about 30° F. to about 705° F. with liquid water in the presence of a catalyst comprising mercury.

Our invention is based on the discovery that iron promotes the reaction between aluminum and water. The iron may be incorporated in the aluminum in any suitable manner. A preferred method, however, is to add iron to molten aluminum. This method is preferred since the aluminum-iron mixture prepared by this method produces best results when used to prepare alumina. The iron may be added to the aluminum before or after it is molten. For example iron dust particles may be contacted with solid aluminum and then the aluminum heated to above the melting point, or in another method the aluminum is molten and iron dust or iron filings added to the melt. The iron appears to dissolve in the aluminum and upon cooling the iron and aluminum are solidified. The mixture is a homogeneous mixture when this method of preparation is used; however, it is not definitely known how the aluminum and iron are associated in the mixture. There may be some strong physical or chemical bonds existing in the solid mixture or the iron and aluminum may be completely disassociated. Whatever the physical makeup, however, the presence of iron in the aluminum considerably speeds the aluminum-water reaction.

The exact role of the iron also is not known. It appears that it is the free iron which is the promoter; however, the iron and aluminum may form a compound which is the actual promoter. Alternatively, the iron may by some means solubilize the surface coating of alumina that is formed by the reaction of aluminum with water causing the alumina to enter into solution and expose more aluminum surface. The iron activator may function to increase the electrochemical reaction by modifying the aluminum to a more easily dissociatable structure or by suppressing the amount of polarization. For example, the iron may cause some internal or intergranular stresses within the aluminum structure thereby rendering the aluminum more chemically reactive.

The iron is preferably used when mercury and/or a mercury compound is also used as a catalyst to accelerate the reaction between the aluminum and water. The iron in such a reaction, that is one in which the reaction is conducted in the presence of a mercury promoter, may have an effect upon the mercury, or the iron may aid in effecting the amalgamation of the aluminum with the mercury. We do not intend to be limited to any of these theories, however, since, as hereinbefore mentioned, the exact role of the iron is not completely known. However, its use greatly affects the speed of the reaction between aluminum and water to form alumina.

The degree of subdivision of the aluminum is another factor determining the rate of the reaction. The smaller the size of the particles, the greater the surface area of aluminum exposed to the water for reaction; a powdered aluminum, if not overly oxidized, is therefore excellent. Granulated or pelleted aluminum, or aluminum in ribbon form is also suitable; however, the larger the particle size of the aluminum metal charge, the longer the time required for complete reaction. In general, pellicles of not more than about an inch in greatest dimension are satisfactory, although those of less than about one-half inch average size are preferred. Aluminum pellets prepared by dropping molten aluminum into water have proven to be very satisfactory for producing alumina by the process of our invention.

The epsilon-alumina which forms rapidly on aluminum surfaces and acts as a coating which normally passivates aluminum does not effectively inhibit reaction under the conditions herein disclosed.

One embodiment of the present invention comprises agitating the aluminum-iron mixture and water sufficiently so that the reaction to produce alumina proceeds at a desirable rate. The reaction velocity is dependent upon the temperature of the reactants, the degree of subdivision of the aluminum, and to a limited extent the concentration or amount of iron, and the degree of agitation given the mixture. Thus a reaction that proceeds slowly at a temperature of 212° F with only a mild agitation or shaking of the mixture will proceed very rapidly if the mixture is vigorously agitated. At a temperature of 572° F., on the other hand, the reaction proceeds relatively rapidly even with a mild degree of agitation. However, if the mixture is subjected to vigorous agitation, the time necessary for complete reaction is substantially decreased.

A preferred embodiment of the present invention relates to a process for producing hydrated alumina which comprises reacting an aluminum-iron mixture with water, agitating the mixture to form alumina, maintaining a pressure sufficient to keep at least a portion of the water in the liquid phase, and separately recovering alumina from the reaction mixture.

It is a desirable feature of the present invention that liquid water be present, and it is thus necessary when temperatures above the boiling point are employed to effect the reaction under sufficient pressure to maintain a liquid phase of water. The critical temperature of water is 705.2° F.; the definition of the critical temperature being that temperature above which a gas cannot be liquefied by pressure alone. It is desirable to use liquid water since it is much easier to have efficient mixing between the aluminum and water accomplished if there is a liquid phase.

The amount of iron used as a promoter appears to be rather critical, especially in the lower limits. We have found that amounts of iron below one hundred weight parts per million of iron (based on the aluminum; that is one hundred weight of iron per million weight of aluminum) do not have a very great accelerating affect on the reaction between the aluminum and water. When at least one hundred weight parts per million of iron (based on the aluminum) is used the iron has a definite accelerating effect. The upper limit is preferably about twenty five hundred weight parts per million, however this upper limit does not appear to be as critical as the lower limit. At above twenty five hundred parts per million of iron, incremental additions of iron do not accelerate the reaction very much and further at above twenty five hundred weight parts per million of iron (based on the aluminum) the iron is present in the alumina in such great amounts that it may be an undesirable contaminant for some uses of alumina.

The use of iron appears to have some effect on the properties of the alumina produced. For example, when iron is used in amounts of at least one hundred weight parts per million weight parts of aluminum, and the conditions of reaction are such that the alumina is formed as a slurry, the product slurry has a higher filtration rate than when iron is not present. Further, we have found that the resulting alumina powder is capable of being processed into pills of much greater strength than normally obtained with alumina prepared when the amount of iron is below one hundred weight parts per million.

While the reaction between aluminum and water is greatly speeded by the use of iron, the reaction is also greatly accelerated by the use of certain catalytic substances such as bases, acids, mercury and/or mercury compounds and combinations of these various substances. It is preferred that mercury and/or mercury compounds be present in the reaction mixture. When a catalyst, for example a mercury promoter such as mercuric oxide, is added to the aluminum-water reaction mixture, the reaction is more rapid than if the mercury compound were absent; however, even though the addition of the mercury compound speeds the reaction, the addition of iron to the aluminum still further accelerates the rate of reaction. It is preferred that the reaction mixture consist of aluminum, iron, water and a mercury promoter; however, other catalysts such as bases and acids may be used.

When the reaction between aluminum and water is effected in an acidic aqueous solution, and the acids are present in only small amounts, a gel is usually produced and when larger amounts of acid are employed a sol is generally produced. For example, to make an alumina sol in the presence of hydrochloric acid, an amount of acid above 0.4 mol per mol of aluminum, and preferably about 0.65 mol per mol of aluminum, may be used, as compared with the stoichiometric amount of three mols. To make a gel, amounts of acid one-tenth as large as those used for sol formation, or even less, may be used.

For purposes of alumina gel formation suitable mineral acids comprise the mono-basic acids, hydrogen fluoride, hydrogen chloride, hydrogen iodide, hydrogen bromide, nitric acid, etc.; the bi-valent acids, sulfuric acid, etc.;

the tri-valent acids, phosphoric acid, etc. Suitable organic acids are the poly-basic acids such as, for example, oxalic acid, malonic acid, succinic acid, maleic acid, phthalic acid, tartaric acid, citric acid, etc. These poly-basic acids result in the desirable gel formation whereas the lower, water soluble mono-basic fatty acids do not. For purposes of gel formation the acid or mixture thereof must be selected in amounts such that the acid anion to aluminum ratio be in terms of stoichiometric equivalents, as herein set forth. The mono-basic inorganic acids usually produce gels when the ratio of mono-valent acid anion is in amounts below 0.13 equivalent of acid anion per equivalent of aluminum, while the bi-valent inorganic acid anion usually is in amounts such that the ratio is below about 0.5. The poly-valent acid anions usually produce gels with a higher ratio of acidic anion of below 1.0 equivalent of acid anion per equivalent of aluminum and even higher; however, ratios below about 1.0 are preferred since ratios greater than 1.0 involve the use of excess free acid anion. For example, sulfuric acid forms gels with $SO_4^=/Al^{+++}$ ratios of below about 0.5 equivalent of acid anion per equivalent of aluminum while the corresponding maximum for $Cl^-/Al^{+++}$ is about 0.13. For gel formation, therefore, the acid is selected from the group consisting of inorganic acids, poly-basic or poly-valent organic acids and acid-acting salts in amounts such that the mono-valent acid anion is below about 0.13 equivalent of acid anion per equivalent of aluminum, the bi-valent inorganic acid anion is below about 0.50, the bi-valent organic acid anion is below about 1.0 and the amount of tri-valent acid anion is below about 1.0. The bi-valent organic acid anions and higher-valent organic and inorganic acid anions form gels above the 0.50 ratio of the di-basic inorganic acids with gels being formed using ratios as high as 5.0; however, ratios much above 1.0 are not preferred since ratios above 1.0 involve the use of excess free acid. Ratios below about 0.01 of any of the acid anions do not usually effectively catalyze the desired reaction.

For purposes of sol formation, suitable inorganic or mineral acids comprise hydrogen chloride, hydrogen iodide, hydrogen bromide, nitric acid, sulfuric acid, etc., or mixtures thereof. The amount of acid or mixtures thereof must be such that the anion/aluminum ratio be in terms of equivalents at least 0.13 and generally within the range of from about 0.13 to about 0.75. The mono-basic acids produce sols even with the lower ratios within this range, while the bi-valent acids require the higher ratios within this range. For example, sulfuric acid forms sols with $SO_4^=/Al^{+++}$ ratios of above about 0.5 equivalents per equivalent while the corresponding minimum for $Cl^-/Al^{+++}$ is about 0.13. The acids which form soluble aluminum salts are those having mono-valent or bi-valent anions, and the limiting or lower ratio of anion to aluminum ratio for sol formation (in equivalents of acid anion per equivalent of aluminum) may be broadly given by the formula, $$R=(0.13)(4)^{n-1}$$

where $n=$ the valence of the anion (1 or 2). For mono-valent anions, $R=0.13$; for bi-valent, $R=0.52$ or about 0.5. Amounts below this range while possessing sufficient catalytic activity tend to produce alumina gels.

Using different concentrations of acids, therefore, produces alumina either as a gel, a sol or crystals of alumina. At temperatures above about 400° F. crystals of alumina are usually produced. The temperature range in which a fluid gel or sol is produced, therefore, is from about 30° F. to about 400° F. although alumina is produced within the broader range of from about 30° F. to about 705° F.

A mercury promoter is preferably added to the water as a promoter or accelerant or catalyst, and it is preferably used in very low concentration. In general, the amount of mercury promoter will usually be within the range of from about 0.05% to about 50% by weight of the aluminum. Concentrations of mercury promoter below this range do not effectively catalyze the reaction, and concentrations above this range often produce undesirable results, for example, the aluminum surface may be so completely amalgamated as to reduce the anodic area sufficiently to decrease the reaction velocity.

The mercury promoter is selected from the following group and may be a mixture of two or more of these mercury promoters: mercury, mercuric acetate, mercurous acetate, mercuric bromate, mercurous bromate, mercuric bromide, mercurous bromide, mercuric bromide iodide, mercurous carbonate, mercuric chlorate, mercuric chloride, mercurous chloride, mercuric fluoride, mercurous fluoride, mercuric iodide, mercurous iodide, mercuric nitrate, mercurous nitrate, mercuric oxalate, mercuric oxide, etc., as well as mercury-nitrogen compounds such as ammono-basic mercuric bromide, ammono-basic mercuric chloride, etc. Almost any other mercury-containing compound may be used and as herein mentioned it may be a mercuric salt, a mercurous salt either organic or inorganic, an oxide of mercury, or a complex of mercury compounds.

Drying the alumina gel at various temperatures produces alumina in various modifications. Drying gibbsite alumina within the temperature range of from about 30° F. to about 400° F. leaves mainly gibbsite alumina. An analysis of the gibbsite alumina dried at 400° F. shows that the product is chiefly gibbsite, however, small amounts of boehmite, a modification of hydrated gamma-alumina, are evidenced. As the temperature of the drying is increased, the percent of boehmite in the product is accordingly increased and at a temperature of approximately 650° F. the product after the drying is analyzed as being almost entirely boehmite.

The reaction of the aluminum-iron mixture with the water, with and without the addition of the mercury promoter, may be effected in any suitable type of equipment wherein the reactants are subjected to agitation and preferably to vigorous stirring. The operation may be carried out in continuous or batch-wise fashion. When temperatures above the normal boiling point of water are employed, and the reaction is performed with water in the liquid phase, it is of course necessary that the reaction vessel be capable of withstanding pressures sufficient to maintain a liquid phase of water. In small scale production of alumina by this process a rotating pressure autoclave is satisfactory. When the temperatures employed are at or below the boiling point of water, the reaction may be effected in ordinary open equipment in which a means is provided for vigorous stirring, agitation or circulation of the reactants. It is, however, necessary that the process equipment be constructed of such material that it is not affected by water or aluminum and/or the promoters used so that undesirable elements are not introduced into the alumina product; however, if the presence of these foreign substances is not objectionable, the above precautions need not be adhered to. Hydrogen is produced by the reaction of the aluminum with the solution and a means of venting must be provided if the pressure build-up caused by the production of this hydrogen is to be avoided. If the equipment will withstand this additional pressure, however, it is not necessary to vent the hydrogen continuously. The amount of hydrogen evolved may be measured by the pressure build-up on the system and/or the amount of hydrogen vented may be passed through a gas meter and the amount evolved measured in this manner.

The iron used as a catalyst remains associated with the alumina and the exact form has not been definitely established. The iron may originally be present as the free metal, but upon exposure to air and water, it probably changes to the oxide.

The following examples are given to further illustrate the novelty and utility of the present invention but not with the intention of unduly limiting the same.

EXAMPLE I

Eighteen grams of aluminum chips approximately one-sixteenth inch wide, one-fourth inch long, and one-sixteenth inch thick, having five weight parts per million of iron dissolved therein were utilized in this test. Distilled water (five hundred grams) and 0.4 gram of mercuric chloride were first placed in a two liter Pyrex flask equipped with a six-bladed Pyrex stirrer and heated. When the temperature reached 100° C. the aluminum chips were added. The hydrogen gas evolved was used to measure the amount of aluminum reacted and the rate of reaction. The stirrer was rotated at 1500 R. P. M. The maximum rate of reaction occurred near the beginning of the run and was 0.60 gram of aluminum reacted per hour per gram of unreacted aluminum. 14.3 hours were required to react 99.5% of the aluminum charge.

EXAMPLE II

The above experiment was repeated in every detail except in this run aluminum chips having fifty parts per million of iron were used. The maximum rate of reaction was 0.49 gram of aluminum reacted per hour per gram of unreacted aluminum. At the end of eleven hours the experiment was discontinued. 93.8 percent of the aluminum chage had reacted in this time.

Examples I and II above illustrate that below one hundred parts per million of iron, the iron concentration does not have an appreciable effect on the reaction rate between aluminum and water.

EXAMPLE III

The experiment as outlined in Example I was repeated in every detail except in this run aluminum chips were used which were prepared from the aluminum as used in Example II by adding iron to the aluminum to give an iron content of 330 parts per million. The iron was added as iron dust to the molten aluminum. This aluminum which contained 330 parts per million of iron reacted at the maximum rate of 1.58 grams of aluminum per hour per gram of unreacted aluminum. Only 4.5 hours were required to react 99.3% of the aluminum charge.

EXAMPLE IV

The experiment was again repeated, this time using aluminum which had eight hundred parts per mililon of iron dissolved therein. The maximum velocity of reaction was 5.59 grams of aluminum per hour per gram of unreacted aluminum and in only 1.5 hours, 98.7% of the aluminum charge had reacted.

Examples III and IV illustrate that amounts of iron of at least one hundred parts per million in the aluminum considerably speed the reaction between aluminum and water to form alumina.

EXAMPLE V

The reaction velocities, in terms of grams of aluminum per hour per gram of unreacted aluminum, were determined at the 30%, 50% and 70% of the aluminum conversion points in each of the above four examples. These reaction velocities were averaged and are shown in the table below.

*Table*

| | | | | |
|---|---|---|---|---|
| Fe, p. p. m | 5 | 50 | 330 | 800 |
| Velocities, as grams of aluminum per hour per gram of unreacted aluminum | 0.24 | 0.36 | 1.02 | 3.25 |

These results are illustrated in the drawing which is a semi-log plot of these data. The drawing illustrates the sharp increase in velocity with iron concentration at above about one hundred parts per million of iron. The graph further illustrates the unexpected or catalytic action of the iron.

We claim as our invention:

1. In the production of alumina by the reaction of metallic aluminum with water, the improvement which comprises reacting the aluminum and water in physical contact with from about 100 to about 2500 weight parts per million of iron based on the aluminum.

2. In the production of alumina by the reaction of metallic aluminum with water, the improvement which comprises reacting the aluminum and water in physical contact with from about 100 to about 2500 weight parts per million of iron based on the aluminum and a mercury catalyst in an amount of from about 0.05% to about 50% by weight of the aluminum.

3. The improvement of claim 1 further characterized in that the iron is dissolved in the aluminum.

4. The improvement of claim 1 further characterized in that the iron is added to the aluminum prior to the reaction of the latter with the water.

References Cited in the file of this patent

UNITED STATES PATENTS

| | | |
|---|---|---|
| 2,449,847 | Heard | Sept. 21, 1948 |
| 2,746,842 | Bloch et al. | May 22, 1956 |
| 2,820,694 | Hervert et al. | Jan. 21, 1958 |

OTHER REFERENCES

Transactions of the Electrochemical Society, vol. 96, No. 3, "The Dissolution of Aluminum . . .," 1949, pp. 170 to 194.

Metal Finishing, April 1956, "Galvanic Corrosion of Aluminum," by Pearlstein, Fred, pp. 52 to 57.